(12) United States Patent
Lynch

(10) Patent No.: US 10,402,551 B2
(45) Date of Patent: *Sep. 3, 2019

(54) TEMPORAL SECURITY FOR CONTROLLED ACCESS SYSTEMS

(71) Applicant: Eric Lynch, San Diego, CA (US)

(72) Inventor: Eric Lynch, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,461

(22) Filed: Jun. 2, 2018

(65) Prior Publication Data

US 2018/0365398 A1 Dec. 20, 2018

Related U.S. Application Data

(60) Continuation of application No. 15/206,676, filed on Jul. 11, 2016, now Pat. No. 9,990,482, which is a division of application No. 14/207,384, filed on Mar. 12, 2014, now Pat. No. 9,390,244.

(60) Provisional application No. 61/777,679, filed on Mar. 12, 2013.

(51) Int. Cl.
*G06F 21/00* (2013.01)
*G06F 21/31* (2013.01)

(52) U.S. Cl.
CPC .................. *G06F 21/316* (2013.01)

(58) Field of Classification Search
CPC ..................................................... G06F 21/316
See application file for complete search history.

(56) References Cited

U.S. PATENT DOCUMENTS

| 6,151,593 | A | 11/2000 | Cho et al. |
| 6,509,847 | B1 | 1/2003 | Anderson |
| 6,571,344 | B1 | 5/2003 | Sitnik |
| 6,720,860 | B1 | 4/2004 | Narayanasawmi |
| 6,895,514 | B1 | 5/2005 | Kermani |
| 7,292,230 | B2 | 11/2007 | Tokkonen |
| 7,706,574 | B1 | 4/2010 | Ross |
| 8,094,791 | B2 | 1/2012 | Kondziela |

(Continued)

FOREIGN PATENT DOCUMENTS

| EP | 2152033 A1 | 2/2010 |
| WO | WO2004021108 A2 | 3/2004 |

(Continued)

OTHER PUBLICATIONS

Pogue, David, "Use It Better: Eight Alternatives to the Hated Captcha" Scientific American p. 1-6 Feb. 2012.

(Continued)

*Primary Examiner* — Mahfuzur Rahman
(74) *Attorney, Agent, or Firm* — Beusse, Wolter, Sanks & Maire PLLC; John L. DeAngelis

(57) ABSTRACT

An apparatus for authenticating a user to gain access or entry. A correct final time interval count is associated with execution of a secure system act; it is revealed to or known by the user prior to ending the secure system act. A counter determines a final time interval count representing a number of time intervals from the beginning to the end of the secure system act. A validation unit validates the user as a valid user if the secure system act matches a correct secure system act and the final time interval count matches a correct final time interval count. If both determinations are affirmative the validation unit produces an authentication signal. In turn a control unit generates a control signal that permits access or entry to the user.

19 Claims, 19 Drawing Sheets

(56) References Cited

U.S. PATENT DOCUMENTS

| | | |
|---|---|---|
| 8,347,103 B2 | 1/2013 | Jones et al. |
| 8,527,773 B1 | 9/2013 | Metzger |
| 8,533,815 B1 | 9/2013 | Upson et al. |
| 8,812,861 B2 | 8/2014 | Osborn |
| 8,953,845 B2 | 2/2015 | Pasquero |
| 9,390,244 B2 | 7/2016 | Lynch |
| 9,990,482 B2 | 6/2018 | Lynch |
| 2002/0144158 A1 | 10/2002 | Hekimian |
| 2004/0085351 A1 | 5/2004 | Tokkonen |
| 2004/0143767 A1 | 7/2004 | Schreiber |
| 2004/0187037 A1 | 9/2004 | Checco |
| 2006/0053301 A1 | 3/2006 | Shin |
| 2007/0101150 A1 | 5/2007 | Oda |
| 2007/0245151 A1 | 10/2007 | Phoha et al. |
| 2008/0098222 A1 | 4/2008 | Zilberman |
| 2008/0301776 A1 | 12/2008 | Weatherford |
| 2009/0150992 A1 | 6/2009 | Kellas-Dicks |
| 2012/0102324 A1 | 4/2012 | McNeely et al. |

FOREIGN PATENT DOCUMENTS

| | | |
|---|---|---|
| WO | WO2009054928 A2 | 4/2009 |
| WO | WO2010000455 A1 | 1/2010 |

OTHER PUBLICATIONS

Klarreich, Erica, "Cryptography Breakthrough Could Make Software Unhackable" Wired Feb. 2, 2014.

TEMPORAL SECURITY FOR CONTROLLED ACCESS SYSTEMS

CROSS REFERENCE TO RELATED APPLICATION

The present application is a continuation application of and claims priority to the patent application assigned application Ser. No. 15/206,676, filed on Jul. 11, 2016, now U.S. Pat. No. 9,990,482, which claims priority to the patent application assigned application Ser. No. 14/207,384, filed on Mar. 12, 2014, now U.S. Pat. No. 9,390,244, which further claims priority to the provisional patent application assigned No. 61/777,679, filed on Mar. 12, 2013. Each of these applications is incorporated herein in its entirety.

FIELD OF THE INVENTION

The invention generally relates to the protection of secure systems. These secure systems have security features that attempt to control access to the system. The secure systems can be physical, mechanical, electrical, software, or otherwise.

BACKGROUND OF THE INVENTION

In today's society, lack of security has become an increasing problem. Inadequate security can result in large financial losses. Providing security to known and unknown threats in physical and virtual spaces is important as we record information and lead our daily lives. Unfortunately, society appears to be progressing forward without concern for the consequences of some of its decisions.

Thus, there is a need for improved security without creating a significant burden on the user. The invention is directed to apparatuses and methods for improving system security that are not burdensome to a legitimate user, but are difficult for intruders to successfully navigate. Furthermore, many times secure systems must be protected against automated attacks, eavesdroppers, and others attempting to gain illegitimate entry. For example, automated attacks are able to attempt password permutations at a much faster rate than a human can.

Three authentication components that are commonly used to protect secure systems are, "What you know," "What you have," and "What you are."

"What you know" is the most common form of authentication and in the prior art more security is provided by increasing the possible permutations or to add additional authentication steps. With computing power continually increasing these techniques provide marginal increases in security, as computers can execute millions of passwords per second where a human normally takes a second or so to enter a single password.

"What you know" is information that the user knows, such as a password, that others do not know. Authentication systems that fall into the "What you know" category include but are not limited to: alphanumeric passwords, Completely Automated Public Turing Test To Tell Computers and Humans Apart (CAPTCHA), personal identification numbers (PINs), patterns, gesture, images, movement(s), spoken passwords, passwords in general, and others familiar to those skilled in the field.

"What you have" is a physical object that you possess, such as a physical key. Authentication elements in the "What you have" category include but are not limited to: a smart key, a physical key, an RFID (Radio Frequency Identification) key, an NFC (Near Field Communication) key, a USB (a key in the form of a plug-in for a Universal Serial Bus), and others familiar to those skilled in the art.

"What you are" is a user's physical characteristics, such as biometrics, fingerprints, retina scans, etc. Authentication systems in the "What you are" category include but are not limited to: biometrics, fingerprints, voice patterns, voice passwords, retina scans, facial recognition, pressure, weight, and others known by those skilled in the art.

Secure systems require a key, digital, electronic, mechanical or otherwise, to gain entry or access. Methods for gaining access to a secure system are referred to herein as a secure system act. In the prior art a single secure system act or a combination of secure system acts are required to gain access to the secure system. Any number of secure systems acts can be required to gain access to a secure system. The present application describes each secure system act individually, recognizing that multiple secure system acts may be required to gain access.

A password is typically a sequence of alphanumeric characters. Entry of one or more passwords is a common secure system act for gaining entry to a secure system, such as a computer. Alphanumeric character passwords can also serve as a key to a form of encryption. That is, cryptographic keys can be protected using alphanumeric keys. The most common interface for entering an alphanumeric password is a keyboard, although it is known that there are many other input devices for entering a password. A secure system act can also comprise a username plus a password, i.e., a 2-tuple secure system act. Then only a known correct username/password combination allows entry to the secure system.

The alphanumeric password is a "what you know" element and only the persons authorized to access the system know this password. For instance, CAPTCHA is a form of an alphanumeric password where the alphanumeric password is displayed so that the persons authorized for access to the system should be able to read it. The user then enters the CAPTCHA password and gains entry. But a computer-based sensor cannot accurately read the CAPTCHA password and therefore will not gain entry to the system.

An alphanumeric password may consist of numbers, such as a PIN password. PIN passwords are commonly entered on physical keypads but entry is not limited to only physical keypads. For instance, an algorithmically generated PIN, such as those used in RSA tokens, is displayed. The user then enters the displayed PIN password to gain access to the secure system.

Pattern passwords e.g., gestures, spoken words and movements, are another common form of authentication to gain access to a secure system. The pattern can be, but is not limited to, moving an interface device such as a joystick in a pattern, tracing or drawing an image, signing a signature, or moving a finger in a certain pattern. The patterns are known only to the user and thus a pattern password is considered a "what you know" element.

Some common interface devices for entering a pattern password include a touch screen, such as those found on mobile devices and touch screen monitors, joysticks, controllers, keyboards, and number pads. This list is meant to be representative and it is understood that there are other forms of entering a pattern password.

Pattern passwords can have a discrete or variable number of possible entries. For instance, mobile devices can be protected with nine proxy points that the user's movement is mapped to. Each proxy point can only be activated once, meaning a pattern password has a discrete number of possible entries; for example a nine proxy point system has 362,880 discrete entries. Another common interface for entry of a discrete pattern password is a numeric keypad; where there are ten proxy points that can be used any number of times, with a limit on the pattern password length. Other common "What you know" pattern authentication elements are known by those skilled in the art.

Another common way to restrict access to a secure system requires a specific physical device, "What you have", such as physical key. The most common physical security key is a physical key for insertion into a keyhole. In one common implementation of a physical key system the user inserts the key into the keyhole and then turns it to gain access to the secure system or space. Other common "what you have" authentication elements include, but are not limited to, smart keys, NFC keys, audio keys, RFID keys, embedded chips/identifiers, credit/debit cards, physical keys, and USB drives. A "What you have" authentication process assumes that only the persons authorized for access to the secure system has the physical key.

Biometrics, "what you are," is another common element for restricting access to a secure system. A common biometric is the fingerprint. The fingerprint is read by a scanner to determine if the user is authorized for accessing the secure system. Other common biometrics include but are not limited to, voice patterns, retina scans, and facial recognition.

Any secure system act can be combined with other secure system acts to make the authentication process more secure. For instance, a common two-element authentication process prompts the user to enter his username and password then a text is sent to his mobile device. The text contains a PIN that the user must enter next. Also, a credit/debit card requires use of a physical card as well as entering the associated PIN or billing zip code.

Providing security to known and unknown threats is important as more of personal and private information and data about each of us is stored in systems that are expected to be secure. We also trust our livelihood and safety to systems such automobiles, cryptography, infrastructure, and physical locks.

BRIEF DESCRIPTION OF THE DRAWINGS

The following detailed description will be further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
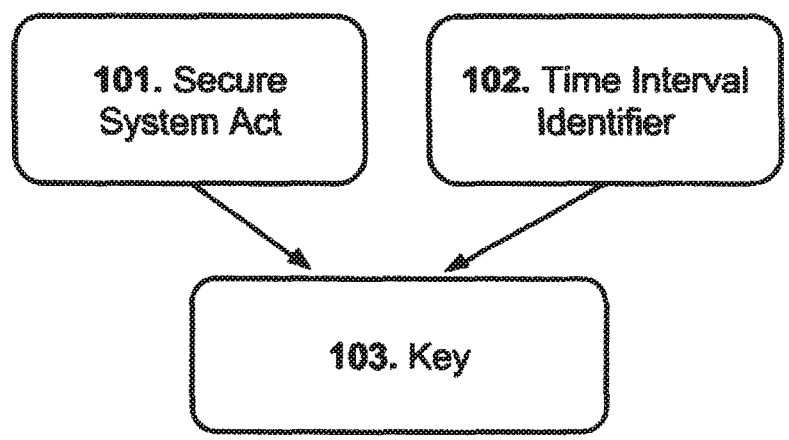
FIG. 1 illustrates elements of a key that includes a time sensitive password.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination. Further, references to values within a stated range include each and every value within that range.

When ranges are used herein for physical properties, such as molecular weight, or chemical properties, such as chemical formulae, all combinations, and sub combinations of ranges for specific embodiments therein are intended to be included.

The disclosures of each patent, patent application, and publication cited or described in this document is incorporated herein by reference in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the spirit and scope of the invention.

The disadvantages associated with today's secure systems acts are known and several have been described above. The performance of secure system acts (e.g., entry of a password) according to a determined time interval, as described herein, provides an increased level of security without adding a significant burden to the user. By tracking information that is readily available, i.e., a time component of the secure system act, access is made more secure. Additionally, differences between humans and computers to gain access to secure systems are highlighted by forcing the computer to spend as much time on each secure system act as a human would spend.

Transactions and authenticated access are made secure through the use of keys (e.g., passwords, gestures). Many keys have multiple components or elements that must be determined to be correct to gain access to a secure system. The novel approach described herein is referred to as transaction dependent protection (TDP) where the protection is provided by a time-sensitive secure system act, i.e., comprising both a secure system act and an associated time interval (or in another embodiment, a time duration) for accomplishing the act.

The time sensitive component (i.e., a time duration to complete the act or the time interval during which the act is completed) may vary as elements of the secure system act are entered. That is, one element of a secure system act may generate a time interval of one or more other elements of the secure system act.

In the embodiment associating a time interval with completion of the secure system act, the duration of each time interval may be identical or each time interval may have a different duration. Further, each time interval is assigned a numeric value. The secure system act must be completed within a given duration, but herein the duration is measured by time intervals. For example, if the secure system act is to be completed in 10 seconds (i.e., the duration for completing the secure system act is 10 seconds) and each time interval is 1 second long, then the secure system act must be completed during the $10^{th}$ time interval. Thus "10" is the identifier of the time interval (also referred to as a time interval identifier) during which the secure system act must be completed.

In one embodiment the time interval for completing the secure system act is set by the user entering a password multiple times, determining the amount of time for each entry of the password, then averaging the time values. The result of the averaging process, which is the time duration, is transformed to a time interval identifier, where the time interval identifier is a numeric value.

Also, the time interval identifier can be set through machine learning based on the length of time the user takes to complete the secure system act. A combination of the secure system act and the time interval identifier for performance of that act comprises a unique signature or key to gain access/entry.

As described in FIG. 1 the TDP comprises a secure system act and a time interval identifier associated with that act. If the act is completed during the associated time interval the user is granted access to a secure system. The secure system act plus the time interval component provides a more secure system.

Before access is granted to the secure system the user must successfully start, perform, and complete the secure act. Secure access today, such as turning a key in a door lock, entering a password, etc. does not include a time component that is part of the process to gain access to the secure system. This invention adds the time component, which provides increased security, in particular against automated computer-based intrusions.

An automated attempt to gain access must take the same amount of time to perform the secure act that a person/user would take to perform the same act. Thus the invention slows each automated attempt to the speed of a user. Use of the time interval component attacks the greatest strength that computers have, versus humans, when trying to gain (unauthorized) entry to a secure system.

Computers process password permutations/combinations and computations at a much higher rate that humans. For instance, keystroke loggers capture each key that has been struck but they do not capture the time of each entry. Prior to the current invention the key strokes identified by a keystroke logger would have been sufficient to gain access to the secure system. According to the invention even if a time sensitive secure act is observed by a hacker, the hacker must also capture the time duration of the act as well as the secure system act itself, to gain access.

For instance, physical locks are often "picked" by using a jumbler that bounces the pins within the lock. While the pins are jumbling pressure is applied to the door handle so that as soon as the tumblers align the handle turns and access is gained. A time sensitive physical lock, when implementing the features of the current invention, prevents this form of attack by requiring the pins to be aligned for a predetermined time before the handle can be turned to gain entry.

The secure system act is defined by an operation that begins the act (i.e., a starting or beginning component) and an operation that ends the act (an ending component or act).

Exemplary Operations That Can Begin a Secure System Act

Non-limiting examples of operations that can be used to begin a secure system act include:

Full insertion of a physical key into a keyhole
Holding a physical key near the keyhole
Turning the key within the keyhole
Non-nulling of a data entry field
Clicking into an entry field.
Tabbing into an entry field.
Placing a finger onto a touch screen.
Placing a finger onto a fingerprint reader.
Moving a joystick or controller.
Placing an eye in front of a retina scanner.
Touching the first number in a PIN entry.
Making an audible noise, such as saying a word or speaking.
Holding a NFC enabled phone, device, card or otherwise within range of a NFC reader.
Placing a device into a computer, such as a YubiKey.
Showing a tattoo to a reader.
Showing a device within or on a person within a certain distance from a reader.
Extracting information from something on or within a person.
Moving to start a movement password or otherwise.

When a user begins a certain action for a second time, resetting the time component and moving from the body of the act to the start of the act.

The operations set forth above are exemplary operations that begin a secure system act. In general, these beginning operations mark the user's start of interaction with the secure system or a validation system associated with the secure system. One skilled in the field can identify other operations that begin or represent a secure system act.

Exemplary Operations that Comprise a Secure System Act

Once the secure system act has begun, any of the following non-limiting operations can comprise a secure system act.

When an alphanumeric password or PIN is used, rendering the field as a non-null field, i.e., making an entry Tracing a shape on the screen or keyboard Speaking Providing a physical device to a system Continually engaging a physical device (e.g., a key) with a system Providing a biometric to a system Continued interaction with the interface that is recording information Any user interface with a system between the start of the secure system act and end of the act can define the secure system act.

These are just a few exemplary secure system acts. In general the secure system act comprises the user's interaction with the secure system or a validation system associated with the secure system. One skilled in the field can identify other types of operations that comprise a secure system act.

Exemplary Operations that Can End a Secure System Act

Examples of operations that can end a secure system act include:

A physical key being turned or pulled out of the keyhole etc.

When the entry field is made null.

When the user resets the secure system act attempt. For instance, the user could clear the alphanumeric password attempt or perform an act that is considered a start of a secure system act.

A click off of the entry field.

Tabbing out of the entry field.

Pulling a finger away from the touch screen.

Removing a finger from a fingerprint reader.

Removing an eye from a retina scanner.

Touching the last number in a PIN entry.

Submitting/entering/clicking enter/submit/deactivate. For example this could be done after entering an alphanumeric password or PIN.

Making a noise such as saying a word or speaking.

Removing the NFC enabled phone, device, card or otherwise from range of a NFC reader.

Removing a device from a computer such as a YubiKey.

Showing a tattoo to a reader or moving out of range from the reader that reads a device that is within or on a person, or otherwise taking information from something on or within a person.

Removing a tattoo from a reader, or moving out of the reader's range so that the reader cannot read a device within or on a person, or otherwise removing information from something on or within a person Moving to start the movement password or otherwise.

Completing the movement/pattern/picture password, hitting a certain number of correct points, saying/clicking/gesturing/or otherwise indicating that the attempt is complete.

Submission, clicking off, pressing enter, tab, deactivation, completing the valid secure system act alone could end the act etc.

These are just a few examples of operations that can end a secure system act. In general the ending operation denotes the time interval associated with the secure system act. One skilled in the field could identify other operations for denoting the end of a secure system act.

Time Interval Counter or Component for Determining a Time Interval

Using time interval identifiers, an interval counter counts the number of time intervals (where each interval is measured in seconds, for example) that have elapsed during execution of the secure system act. The intervals may be correlated to real time or fixed or approximate time intervals, computer cycles, etc. A timer/counter can be electrical or mechanical.

A validation unit determines if the secure system act was completed within the associated time interval. If both the act and its completion during the associated time interval are correct, the user gains access or entry to the secure system.

One embodiment supplies the validation unit with only the time interval count when the secure system act has ended. Another variation records or sends the time interval information to the validation unit each time the time interval count changes. In the latter case the time interval counter continues incrementing/counting until the secure system act has been completed.

The time interval counter can also be reset during a secure system act. The reset may occur, for example, if the secure system act is restarted. For instance, if the start of the secure system act is to make the field non-null, if the user rendered the field null a second time, the time interval counter resets such that when the secure system act is restarted the time interval counter also restarts.

Each time the temporal interval count changes the information entered by the user during the previous interval can be input to the validation unit with an identifier for the interval during which it was entered. Alternatively, a change between the current and past temporal interval counts can be sent to the secure system.

In one embodiment the time interval component of the invention comprises one or more time intervals that are tracked using a time interval identifier. Each time interval can be independent of or dependent on the other time intervals and time-sensitive password attempts.

The time intervals can be tracked mechanically, electrically, or otherwise.

Some exemplary techniques for determining the time intervals are set forth below. They are merely representative examples and are not meant to be exhaustive. Those skilled in the art will appreciate that other implementations for determining the time intervals are also possible.

Each time increment within a time interval can have the same predetermined fixed duration. An example of this implementation is a time duration of one second.

Each time increment can be randomly generated. Examples of this implementation include, but are not limited to: the user types a password multiple times and the computer determines that it takes the user an average time to complete entry. Then using the average, the validation system generates a time interval that becomes part of the entry key.

The duration of each time interval is random, but the sum of the time durations is a fixed value.

The time duration of all intervals are random and the user must wait until a time interval identifier appears on a display screen visible to the user. Once displayed the user knows that the time component of the entry/access key is active and the user must execute the proper operation to end the secure system act within that interval.

Time durations can be dynamically allocated. An example is the user failing to complete the secure system act in the proper time interval. For the next attempt the user is allocated a longer time interval to complete the act. This is an example of a dynamically allocated time interval based on past entries. The intervals can also be dynamically allocated based upon current information such as a slower typing pattern/speed than normal or the use of numerous backspace strokes. Notwithstanding any dynamic change in the allotted time duration to execute the secure system act (where the allotted time duration is represented by a time interval identifier) the user must complete the secure system act within the currently designated time interval.

The user can define the time duration. The user could say time interval one has a duration of a tenth of a second, interval two a duration of half a second, interval three a duration of a second, etc. Thus each time interval may have a different duration and the user can select the duration of one or more of the time intervals. Further, one of these time intervals is selected as the proper time interval within which to complete the secure system act.

The computer can generate a time duration for each time interval randomly or based on past user entries.

The computer displays a time interval identifier that the user must consider as an element of password entry. For example, for a CAPTCHA implementation, the system provides a CAPTCHA password to the user in a form that a computer cannot easily read, but a human user can easily read. CAPTCHA also provides an interval identifier, which is a component of the secure system act. CAPTCHA may display "B408MT//7", where "B408MT" is the password and the user must wait until a "7" appears in the time interval region of the display, and when the "7" appears the user must end the secure system act to gain access/entry.

The time durations can be defined algorithmically. The durations may increase or decrease. For example, the time interval duration can be equal to the interval number divided by three plus ten.

The time intervals can be unknown and not displayed to the user. The first time interval may have a duration of a tenth of a second and the second time interval an infinite length.

These are just a few examples of techniques for establishing the time interval component of the time sensitive password for a secure system act.

The time component of the secure system act according to the present invention comprises time intervals that are tracked by time interval identifiers. These time interval identifiers may displayed to the user, but this is not necessarily required. If displayed, the time interval identifier can be displayed to the user visually, auditory, by haptic feedback, or otherwise. The below examples are representative and not meant to be exhaustive as one skilled in the art will understand that other implementations are possible.

Time interval identifiers can be visually displayed with a conventional measure of time, seconds, etc.

Time interval identifiers can be visually displayed with a numeric count.

Time interval identifiers can be visually displayed with an alphanumeric character string.

Time interval identifiers can be visually displayed using a color, colors, patterns, images or otherwise.

Time interval identifiers can be displayed using an auditory mechanism, such as a constant sound throughout a time interval, a sound at the transition of time intervals, a pattern of sounds or otherwise.

Time interval identifiers can comprise a haptic feedback mechanism such as a vibration, a vibration pattern during a time interval or at transitions, such as when a user inserts a physical key into a door.

The time interval identifiers do not need to be displayed to the user and the user does not need to know the time interval. The time interval identifier can be stored by the secure system, computer, electronically, physically, mechanically, or otherwise. Thus the invention comprises two different embodiments one in which the time interval identifier is displayed to the user and another in which the time interval identifier is not displayed to the user.

In a first embodiment the time interval comprises in effect two time subintervals. The first subinterval is less than a second in length and the second subinterval is infinite in length. According to this embodiment an automated attempt to gain access by a computer system will fall into the first time interval and fail because the duration of the computer access attempt will be less than one second. The secure system act will have been completed before the second subinterval has begun. Since access/entry is gained only when the secure system act has been completed within the second subinterval (where the time interval of interest is in fact the sum of the first and second subintervals) access/entry is denied.

But a human user's attempt will fall into the second subinterval (a human user cannot execute any secure system act in less than one second and thus the first time subinterval will have expired) and will be successful since the second subinterval is of infinite duration.

According to a second embodiment, the time interval is selected based on the user's consistent, i.e., always taking about the same time duration, execution of the secure system act.

FIG. 1 illustrates the components of a time-sensitive password system (or TDP) of the present invention. Execution of the secure system act comprises an element 101 and the time interval identifier for completing the secure system act comprises an element 102. The time interval identifier is the time component associated with the secure system act. That is, the secure system act must be completed within the time interval identified within the element 102.

In one embodiment the invention derives its secure features based on the number of time intervals between the start of the secure system act and the beginning of the valid time interval (where the time interval identifier denotes the valid time interval). The greater number of time intervals between these two events, the more secure the system. That is, an intruder will need to complete the secure system act within each time interval (where each time interval may also be considered a time bin) as the intruder attempts to gain entry/access. Of course, the intruder must know beforehand that to gain access/entry the secure system act includes a time component.

On the first attempt the intruder will complete the secures system act during the first time interval, then on the second attempt during the second time interval, etc. More bins or intervals between the beginning of the secure system act and the valid time interval suggests that the intruder will take a longer time to gain access. This extended time to gain access is generally sufficient to discourage further attempts to gain access, especially for automated intruder attempts.

FIG. 1 depicts a more complex and secure key than known in the prior art. The components of the key may or may not be sent together or to the same location for validation.

Figure 2:
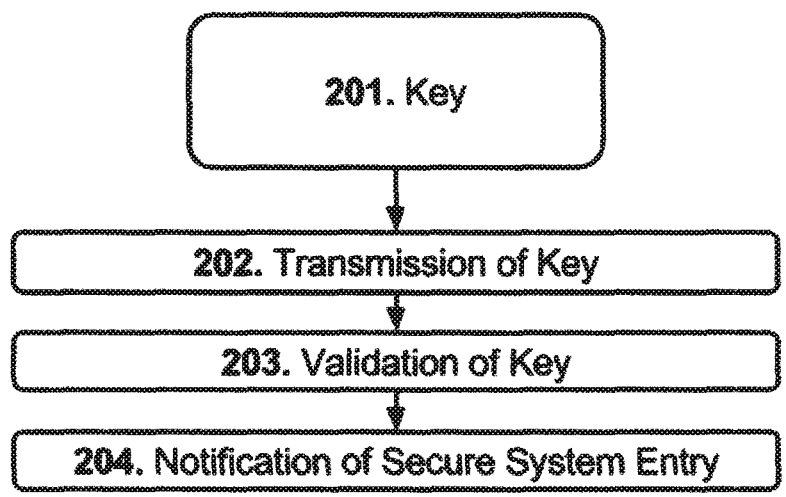
FIG. 2 illustrates general steps for gaining access to the secure system.

FIG. 2 illustrates the steps associated with granting access once the key has been entered at a step 201. The key is then transmitted to a validation system, step 202, where it is validated, step 203. Once validated a notification of secure system entry, step 204, is delivered to the user and access is granted or denied.

The time sensitive password can be stored locally then transmitted or transmitted then stored. Information intended for the secure system can be transmitted during the secure system act, withheld until the end of the secure system act, or otherwise. If access is not granted the user can be notified of the failure to gain entry.

The time interval identifiers, which may or may not be displayed/portrayed to the user, and do not need to necessarily directly indicate the time duration as a numerical value, such as the time interval count.

But the time interval identifier can be mapped to a specific color or a specific picture, where the specific color or picture represents a specific time interval to the user. The user sees the displayed color or picture and must complete the secure system act within the time interval associated with the displayed color.

Time intervals can be displayed to the user to assist with execution of the time sensitive secure act. For instance, if a user completes the secure system act properly but is denied entry, the time interval identifier is displayed to the user to permit them to understand why they were denied entry. That is, entry was denied because the time interval component associated with the user's performance of the secure act did not match the stored time interval identifier associated with the secure system act.

In another embodiment the time interval identifiers is mapped to another action. For example, a sequence of colors is displayed to the user, who must complete his secure system act in the time before or when the proper color is displayed. Of course, in this example as well as others presented herein, the secure system act and the time interval must both be validated as correct before entry to the secure system is granted.

In one embodiment if information is sent during the secure system act each time interval identifier must have the proper portion of the secure system act tied to it. Each portion of the secure system act and its corresponding time interval identifier must be correct.

Figure 3:
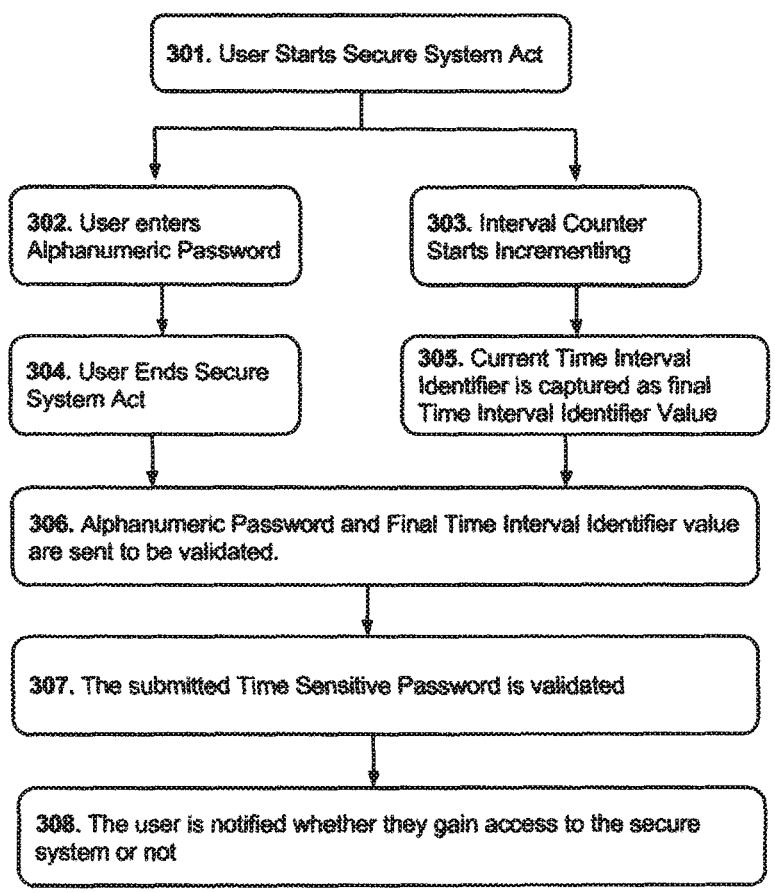
FIG. 3 illustrates an embodiment using an alphanumeric password for gaining access to the secure system.

FIG. 3 illustrates more detailed steps associated with the present invention. A secure system is protected by a secure system act, which in this case is an alphanumeric password. To gain access to the system, the user must enter the alphanumeric password through an interface. The user may have previously entered their username in response to a prompt. The correct alphanumeric password and the correct time component are required to gain access to the secure system. The time component can be presented to the user by the time interval identifier or it can be hidden from the user. Whether or not the time interval identifiers are displayed to the user, the time interval component for the secure act must be correct to gain access to the secure system.

The user starts the secure system act at step 301. Common techniques for beginning the secure system act are described elsewhere herein. Once begun, the user enters the alphanumeric password and the system begins counting time intervals.

The user enters their alphanumeric password at a step 302.

As each time interval ends the next one begins (step 303). Each time interval has an identifier. Each time interval may have the same duration, varied, algorithmically defined, random, dynamic, user-defined, as further described elsewhere herein. The identifier may or may not be presented to the user. In those embodiments where the time interval identifier is not presented to the user, the time interval identifier is still used as an element of the key with the alphanumeric password to gain access.

The user ends the secure system act at a step 304. There are a number of ways to end the secure system act and these have been described elsewhere herein. When the secure system act has ended, the system captures the current time interval identifier as the final timer time interval identifier. See a step 305.

The entered alphanumeric password and the final time interval identifier together comprise the key that allows entry into the system. The components of the key may or may not be sent together or to the same location for validation. See a step 306.

Both the alphanumeric password and the final time interval identifier must be correct/accepted for the key to be accepted. If both are correct and accepted entry to the secure system is validated and approved at a step 307.

After validation the user is notified that access has been granted to the secure system. See a step 308.

Figure 4:
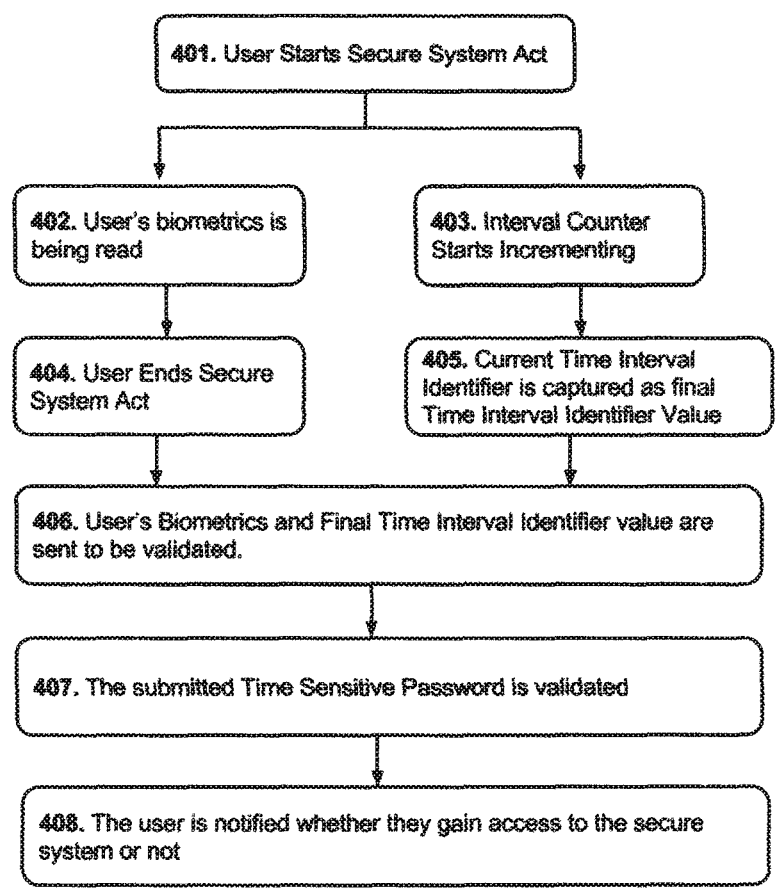
FIG. 4 illustrates an embodiment using a biometric password for gaining access to the secure system.

FIG. 4 illustrates more detailed steps associated with an embodiment in which a user's biometric characteristic(s) or biometric password serves as a secure system act. Biometric passwords are provided to a biometric sensor that determines if the presenting person is allowed or denied access. There are many ways for the user to start and end the secure system act when using a biometric password. For instance, the user can begin a biometric password when using a fingerprint reader by simply providing their finger to a sensor. The end of the biometric password can be defined as the act of removing their finger from the sensor. The proper biometric and the proper time interval are both required to gain access to the secure system. Generally, the steps set forth in FIG. 4 mirror those of FIG. 3, except for the nature of the secure system act, and need not be discussed further herein.

Figure 5:
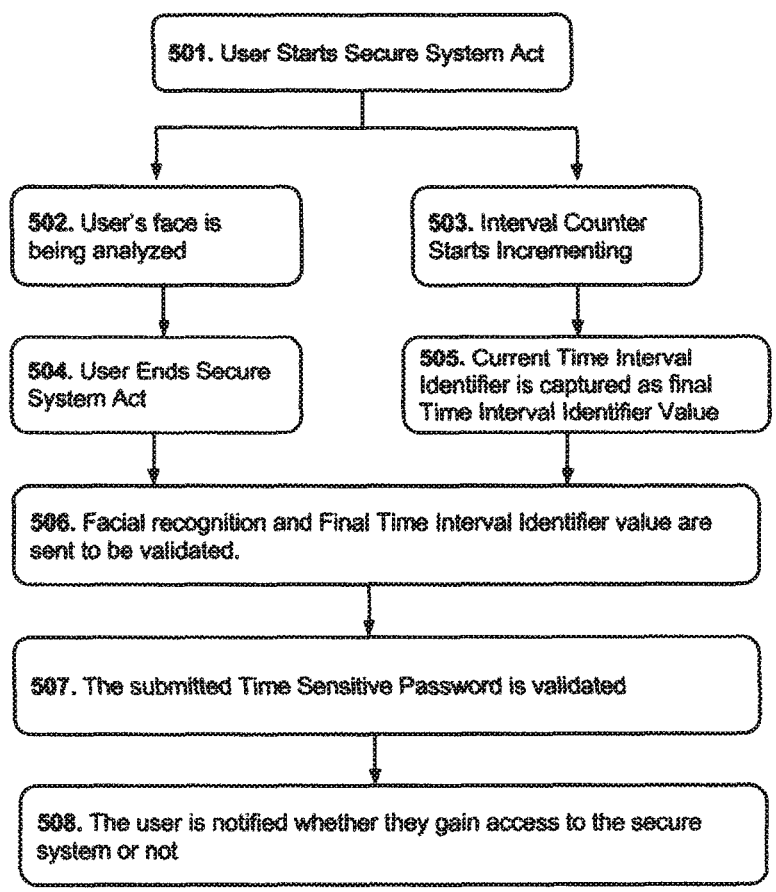
FIG. 5 illustrates an embodiment using a facial recognition password for gaining access to the secure system.

FIG. 5 illustrates steps associated with a secure system act comprising a facial recognition password. Both the facial recognition password and the correct time interval component are required to gain access to the secure system. In this case the facial recognition device must determine whether the presented facial characteristics match the facial characteristics of one who is permitted access to the secure system. Further, one of the "ending" operations described elsewhere herein represents the end of the secure system act.

Figure 6:
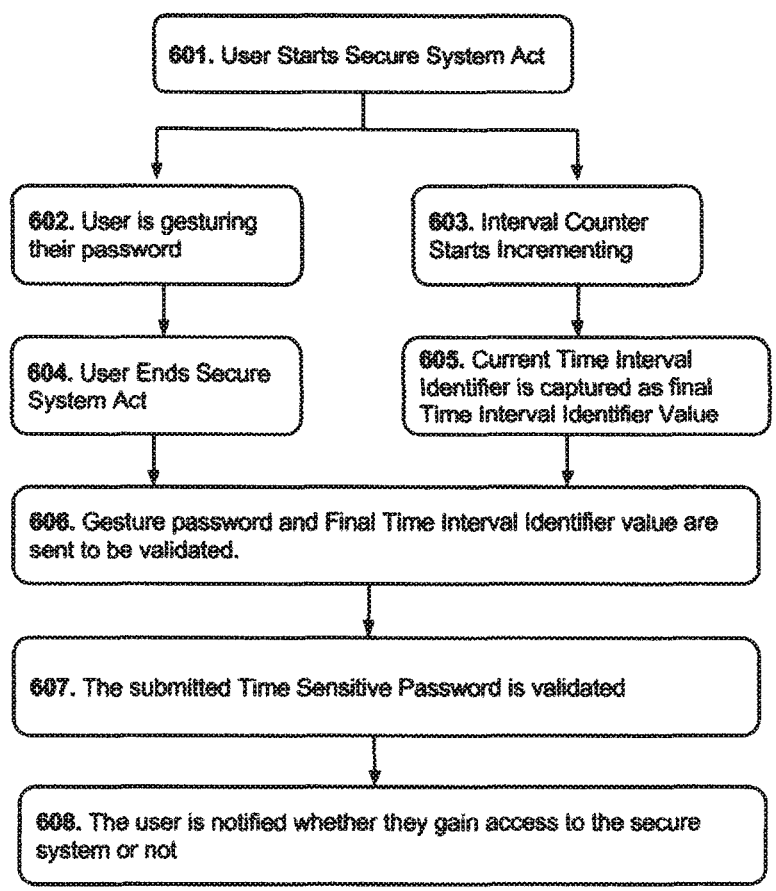
FIG. 6 illustrates an embodiment using a gesture password for gaining access to the secure system.

FIG. 6 illustrates more detailed steps associated with the present invention in an embodiment where the secure system act comprises a gesture password. The gesture and the time interval component are required to gain access to the secure system.

Figure 7:
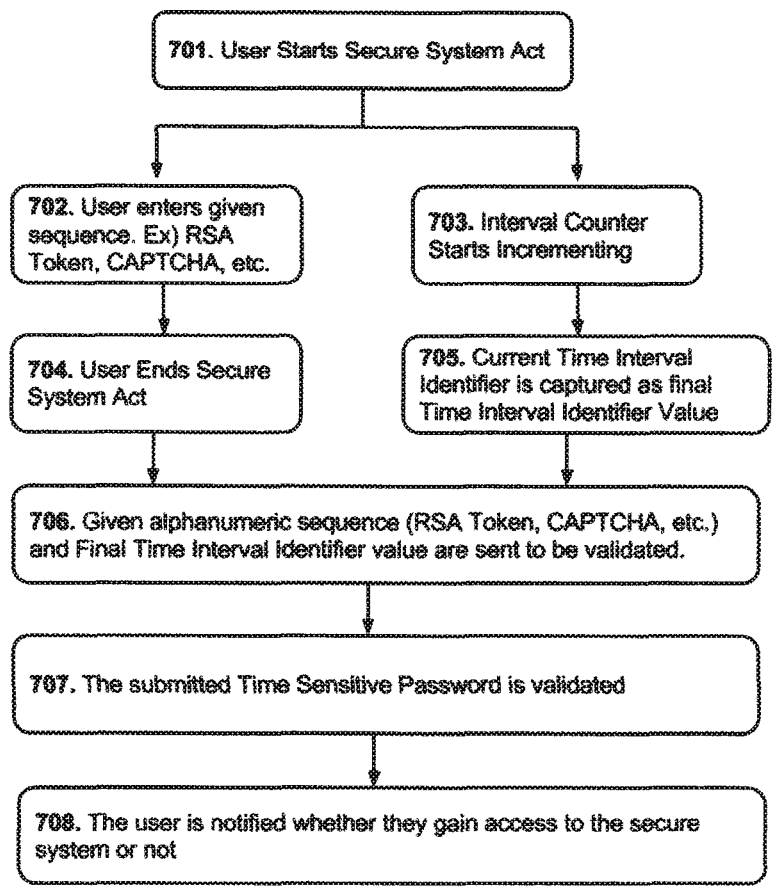
FIG. 7 illustrates an embodiment using an alphanumeric sequence for gaining access to the secure system.

FIG. 7 illustrates more detailed steps associated with an embodiment of the present where the secure system act comprises a CAPTCHA, RSA token, or an alphanumeric sequence that is provided to the user for entering as the secure system act. The provided secure system act and the time interval component are required to gain access to the secure system. In one embodiment the correct time interval identifier could be provided with the secure system act or otherwise presented to the user. Further, the time component can be presented to the user according to a time interval identifier or it can be hidden or encrypted. In either implementation the secure system act must be completed during the correct time interval to gain access to the system.

Figure 8:
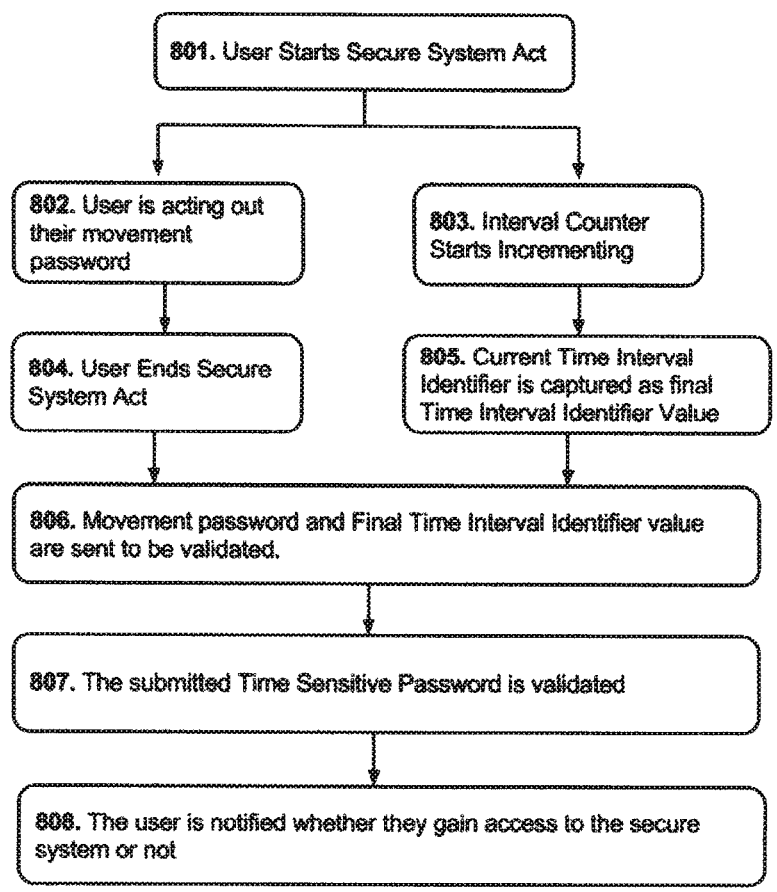
FIG. 8 illustrates an embodiment using a movement password for gaining access to the secure system.

FIG. 8 illustrates more detailed steps associated with an embodiment of the present invention using a movement password to gain entry or access. Both the correct movement and the correct time interval are required to gain access to the secure system.

Figure 9:
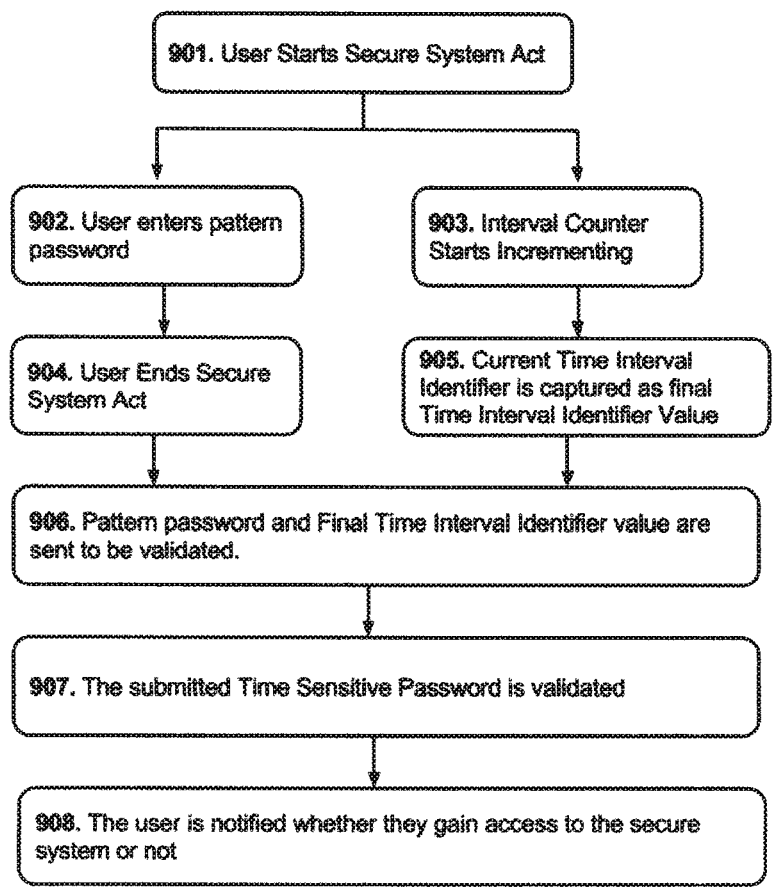
FIG. 9 illustrates an embodiment using a pattern password for gaining access to the secure system.

FIG. 9 illustrates more detailed steps associated with an embodiment where the secure system is protected by a pattern password. The correct pattern and the correct time interval are both required to gain access/entry.

Figure 10:
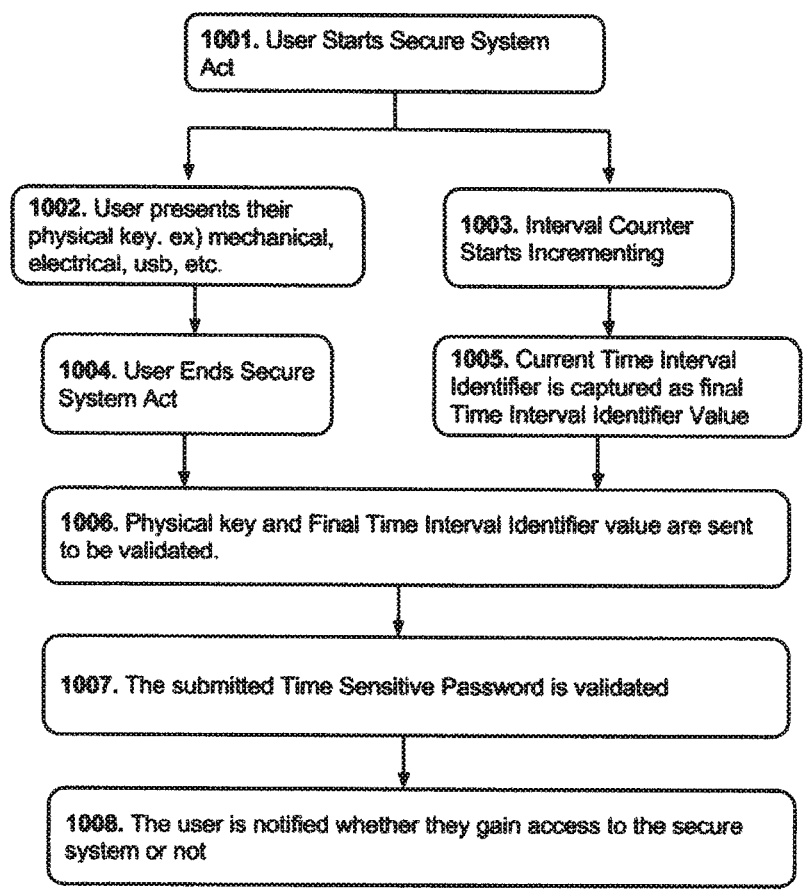
FIG. 10 illustrates an embodiment using a physical key for gaining access to the secure system.

FIG. 10 illustrates more detailed steps associated with the present invention in which the secure system act comprises a physical key. To gain access/entry to the system the user must supply the physical key. The physical key and the time interval corresponding to the secure system act (which may be the time duration during which the physical key is supplied to the secure system) are both required to gain access to the secure system.

Figure 11:
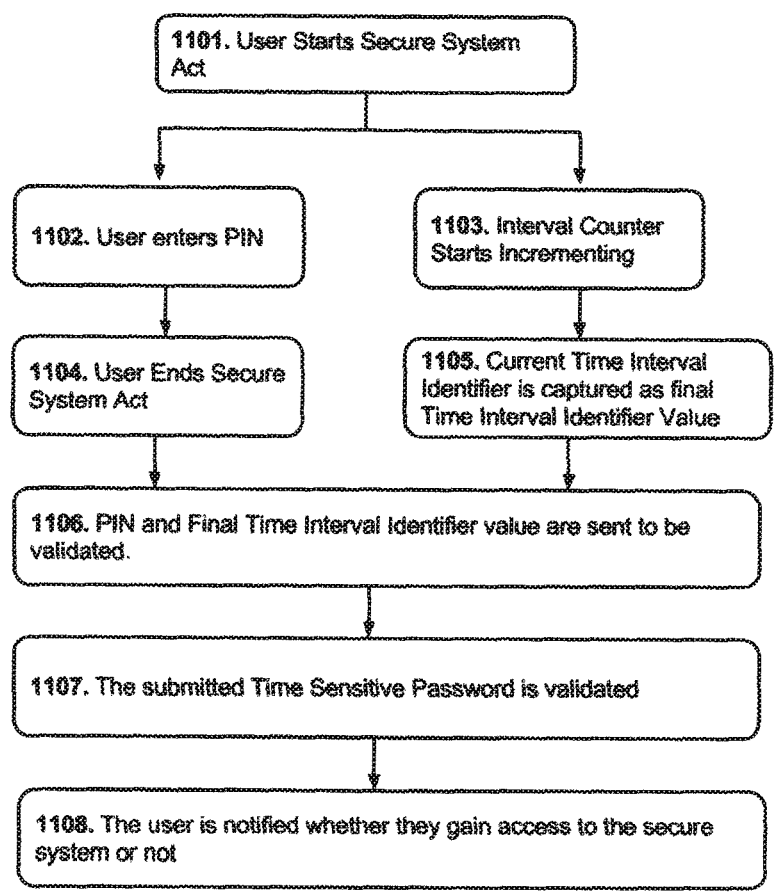
FIG. 11 illustrates an embodiment using a PIN password for gaining access to the secure system.

FIG. 11 illustrates an embodiment where the secure system is protected by a PIN password. The user may present a physical device such as an ATM, smart card, debit card or otherwise, prior to being required to enter the PIN password associated with that physical device. Both the correct PIN and the correct time interval are required to gain access to the secure system.

Figure 12:
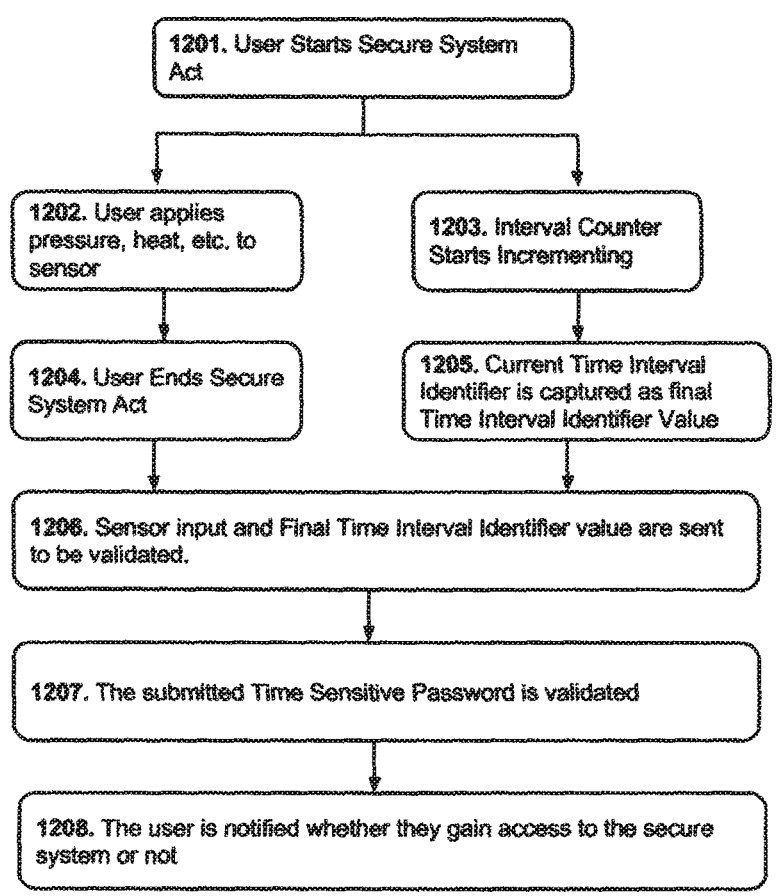
FIG. 12 illustrates an embodiment using a sensor based password for gaining access to the secure system.

FIG. 12 illustrates more detailed steps associated with an embodiment where the secure system is protected by a sensor password, such as pressure, heat, sound or otherwise. To gain access the user must supply the sensor with the proper feedback, which can be accomplished by a sensor interface. The correct sensor input and correct time interval associated with the sensor-based secure system act are required to gain access/entry to the secure system.

In one embodiment a numerical value for the sensor input (e.g., amount of heat, pressure) is not necessarily relevant, only that the proper type of sensor input is expected. For example, this embodiment can be implemented on a mobile phone that has NFC capability. The NFC on the phone is then only activated if the user's finger or hand is touching any region of the touch screen and thereby activates a pressure sensor. According to the present invention, to improve phone security the pressure measurement can include a time interval component. For example the user must apply pressure to the touch screen pressure sensor for a predetermined period of time, e.g., 2 seconds. The time intervals are counted/incremented during application of the pressure. The time interval when the pressure is removed (corresponding to the end of the secure system act) is captured and represents the final time interval identifier, which must match the correct time interval identifier for the user to gain access.

Figure 13:
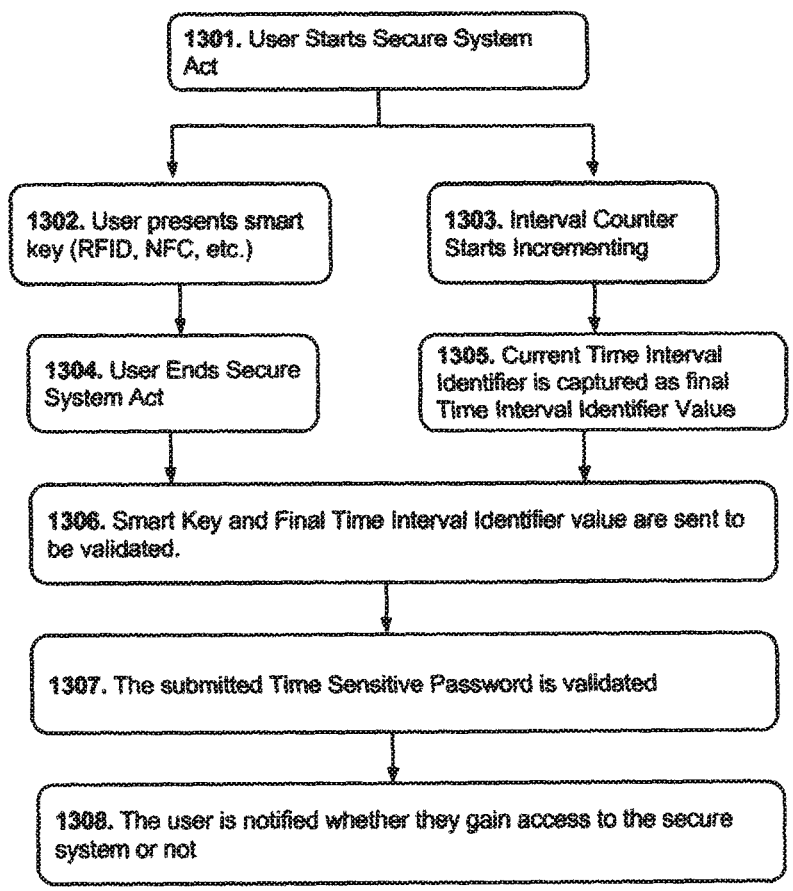
FIG. 13 illustrates an embodiment using a smart key for gaining access to the secure system.

FIG. 13 illustrates more detailed steps associated with an embodiment in which the secure system is protected by a smart key, such as those required to enter buildings and rooms within buildings as well as cars which use RFID, NFC, or otherwise to validate that the proper key is present. Some keys have active circuitry on them whereas others use passive circuitry. The smart key and the time interval component are required to gain access to the secure system.

Figure 14:
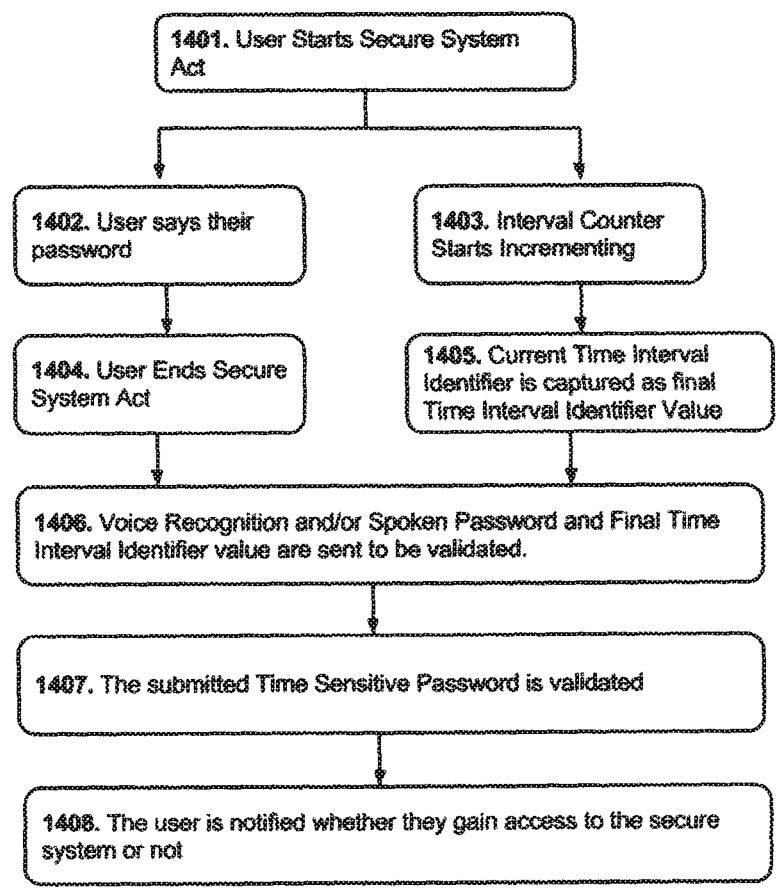
FIG. 14 illustrates an embodiment using a spoken password for gaining access to the secure system.

FIG. 14 illustrates more detailed steps associated with the present invention where the access is gained via a spoken password. The spoken password and the time interval component are both required to be correctly validated to gain access to the secure system.

In each of the embodiments illustrated in the foregoing figures, a time interval counter begins counting when the secures system act is started by the user. The counter increments/counts until the secure system act ends. At that time the current count value is captured and designated as the final time interval identifier value. This captured final time interval identifier must match the correct final time interval identifier (which is another component of the key to gain entry/access) for the user to gain access/entry. That is, the secure system act must have been completed during the correct time interval to gain entry/access.

There are many techniques for setting the correct time interval parameter before the user attempts to gain access to the secure system. For example, the correct time interval parameter can be set based on the time the user takes to enter a password. For this specific example, the user enters their username and password. As the user is typing the password the time interval parameter is displayed and dynamically changing (e.g., increasing). The user enters their key combination multiple times to ensure that they have set the intended 3-tuple key. The locked system or validation unit knows the key combination required to gain access.

The time interval parameter (or TDP parameter) can depend on other characteristics of entry such as the pressure applied to the keys during entry. The TDP parameter does not need to be represented using integer numbers or even by numbers. As described elsewhere a color or symbol can be used to represent a time interval, where the authorized user knows the time interval associated with each color/symbol. When the correct color is displayed, the user knows to end the secure system act before the next color appears.

Figure 15:
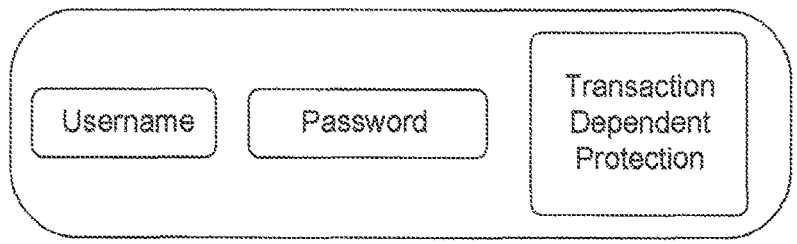
FIG. 15 illustrates a transaction dependent protection (TDP) 3-tuple key.

FIG. 15 illustrates the user name and password fields of conventional password entry schemes and a field that displays the TDP or time interval parameter.

Figure 16:
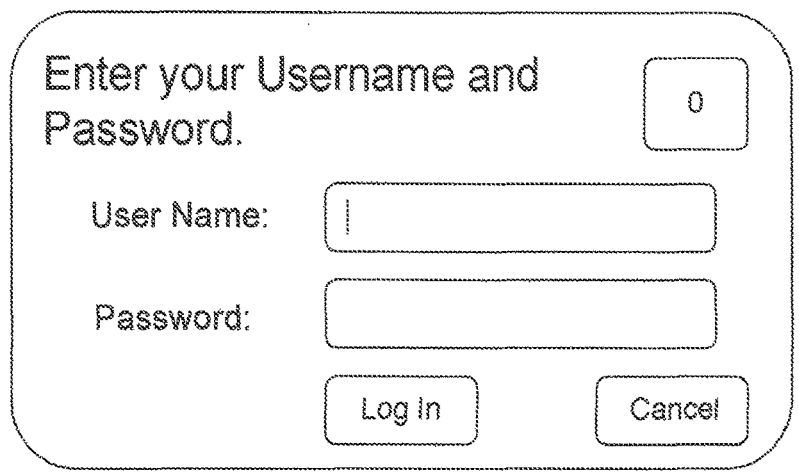
FIG. 16 illustrates an exemplary TDP layout on a display screen.

The TDP parameter or time interval parameter is displayed on the right side of the FIG. 16 and the vertical line represents the user's cursor. The empty prompt screen is displayed while waiting for the user to start entering their user name and password key to gain access or entry.

Figure 17:
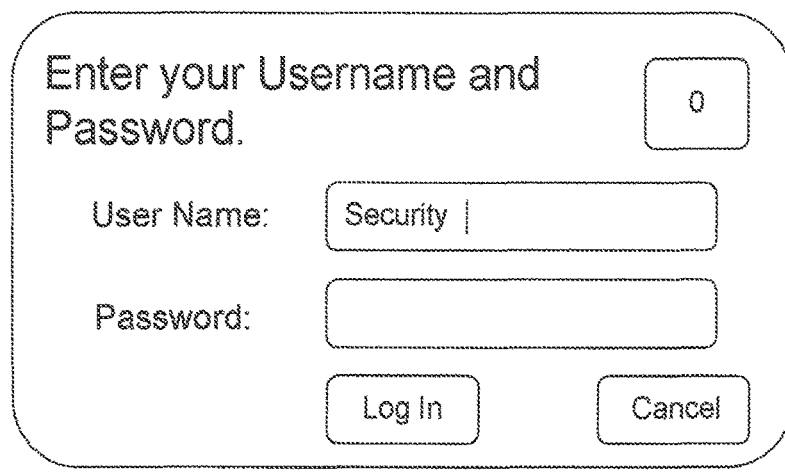
FIGS. 17-19 illustrate sequential TDP entry steps as displayed on a display screen.

In FIG. 17 the password entry process has begun as the user has entered their User Name parameter. Entry of the password parameter has not been started and thus the TDP parameter remains at 0.

Figure 18:
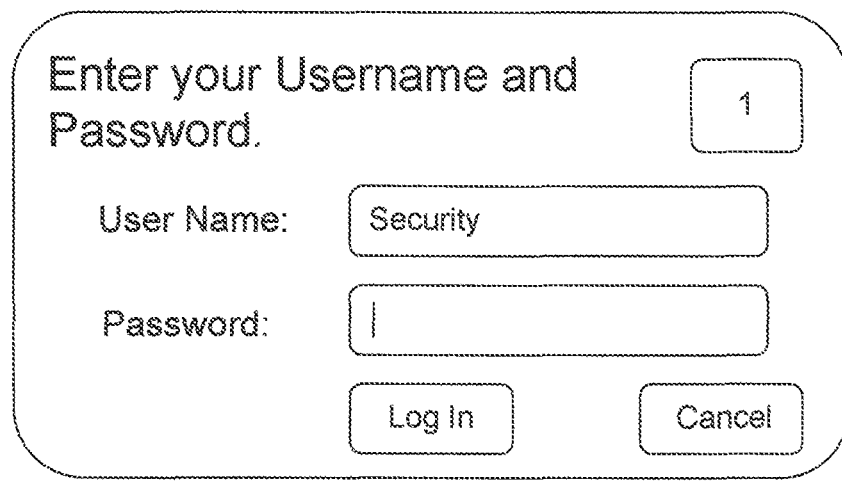

FIG. 18 depicts the user moving the cursor down to enter the password prompt box. As the user moves to enter the password parameter the time interval value increases to 1.

Figure 19:
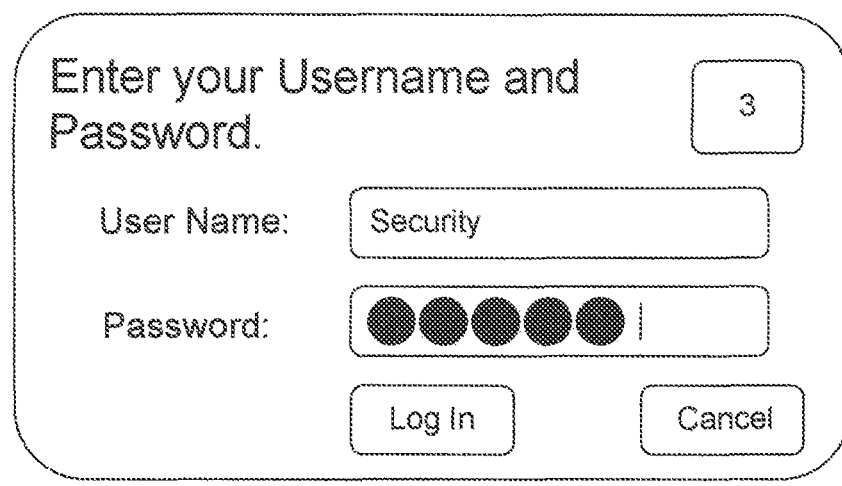

FIG. 19 shows completion of the password entry. The user is about to either click enter key to submit their key or click the "Log In" button. The TDP parameter corresponds to the time interval when password entry has been completed. In this example the user took between three and four seconds to enter their password, causing the TDP parameter to display the numeral three.

Figure 20:
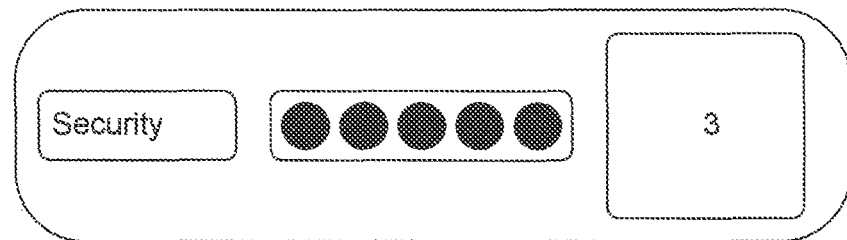
FIG. 20 illustrates the information sent to a validation unit for authenticating a user to gain entry/access.

After the log in button has been clicked, FIG. 20 represents the submitted information. The system is presented with the submitted information (key) (the password and the time interval identifier) and if it matches the valid key(s) the user gains access to the system.

In the above implementation if the user at any time pressed and held the keyboard backspace to clear the password field and then pressed the backspace an additional time the TDP parameter would have been reset. This allows the user to retry entry just as if they had incorrectly entered their password in the typical username/password 2-tuple system.

Another feature that could be implemented in the above embodiment comprises an alternate valid TDP parameter. This alternate parameter allows the user to successfully enter their key if they are using a different entry method than expected or if the user is injured or otherwise impaired.

Figure 21:
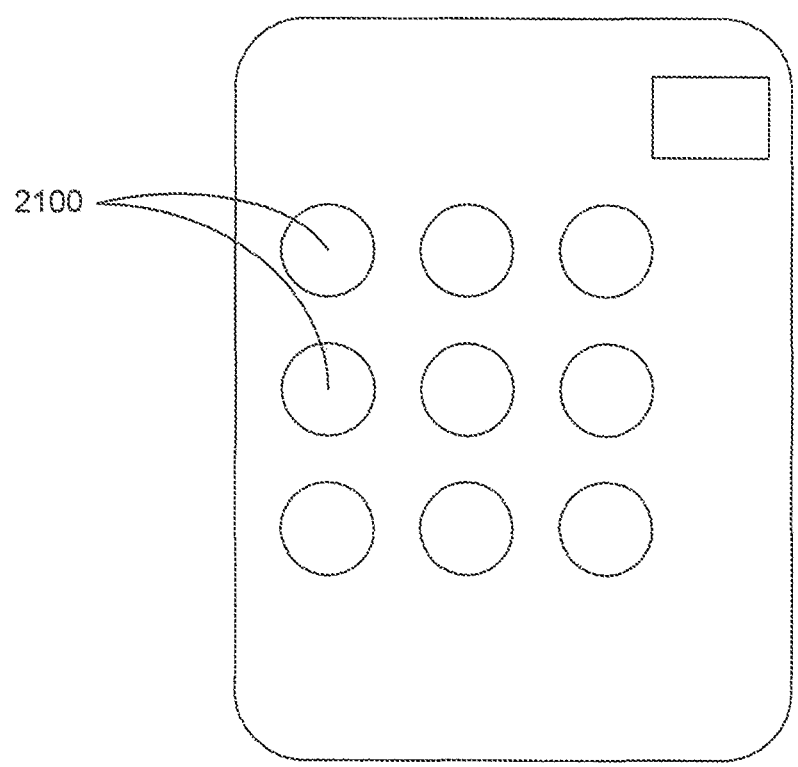
FIG. 21 illustrates an exemplary TDP layout for a pattern password.

Another exemplary password comprises a picture or pattern password as described above. FIG. 21 illustrates a pattern entry device comprising a plurality of keys 2100. A picture or pattern password requires the user to touch the picture in a certain locations according to a predetermined sequence to create a keyed pattern.

A time interval parameter is added according to the time expended to make the pattern. Additionally, a force associated with each press, a speed to complete the pattern, or another factor related to pattern entry can alternatively serve as the TDP time component.

Audio and video keys could also have TDP implementation parameters to increase access security. For an audio key the TDP parameter can be determined as the time taken to say a certain word, the volume of the word, an accent, or another characteristic of the spoken word.

As computer systems continue to improve they may be able to predict when the user may make a mistake and stop the user before the mistake is committed. For software applications they could warn a user that a link contains a virus or advises them that their current password is unsafe due to multiple reuses of the same password. The system may also advise a person that their buying habits indicate an unhealthy addiction.

A hardware solution can be implemented for intersection traffic lights. When a traffic signal turns from green to yellow the controlling system knows the yellow duration before the signal turns red. But the user does not know this information.

Thus the driver is in a predicament as they may continue through the intersection and thereby "run" a red light. Predictive security implemented in the traffic signaling system allows the system to communicate with the car by sending information to the car.

This information can include the duration of the yellow light and additional information that permits the car to determine a distance between the traffic light and the car. Once the car receives the information it can determine its speed and the distance from the traffic light and calculates whether the car can pass through the yellow light before the light turns red.

Alternatively, the information sent to the car can originate from a number of other sources, including other vehicles, sensors embedded in the roadway, handheld devices such as cell phones, or the car itself sensing conditions relevant conditions and parameters.

If the user cannot make it through the light safely the user is notified and advised to stop or the system can override the user and stop the car. For instance, the notifications can be optical, haptic, vibratory, aural, or otherwise. The system may override user control by applying the brakes automatically, sounding the horn, maneuvering the car to avoid a collision or otherwise.

This sequence of events is illustrated in FIGS. 22-25.

Figure 22:
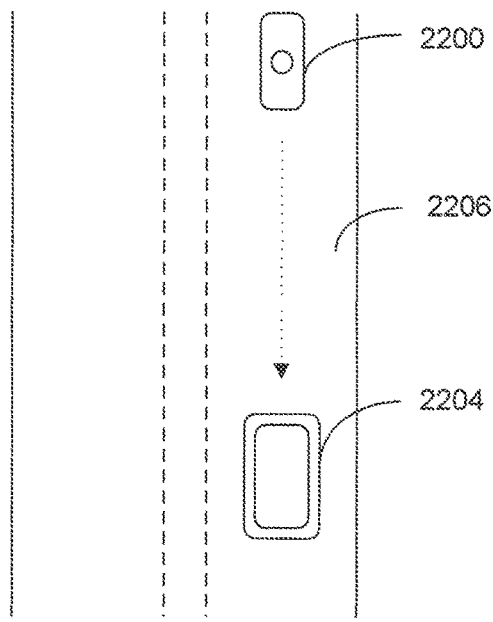
FIGS. 22-24 illustrate exemplary predictive security applications for an embodiment of the present invention.

FIG. 22 illustrates a traffic signal 2200 that sends information to a vehicle 2204 traveling along a highway 2206. The information includes a time duration of the yellow signal.

Figure 23:
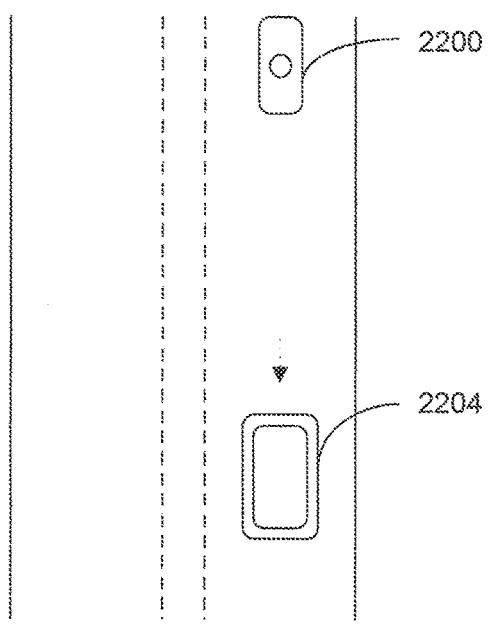

At FIG. 23 the vehicle 2204 receives the information and calculates its speed and time to reach the signal 2200.

Figure 24:
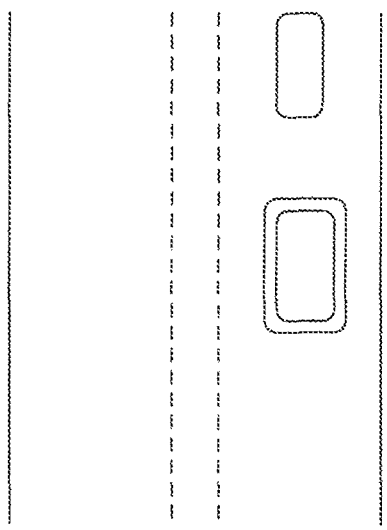

FIG. 24 illustrates that the vehicle 2204 has stopped short of the intersection and thereby avoided passing through a red signal.

Figure 25:
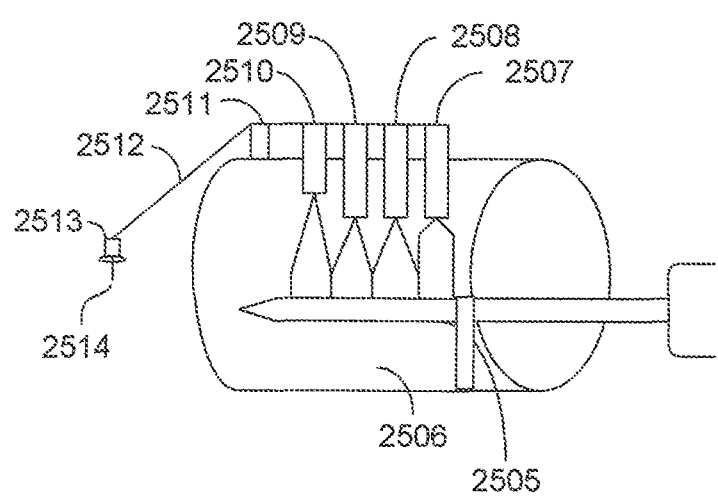
FIG. 25 illustrates a physical key embodiment of the present invention.

FIG. 25 depicts a physical key embodiment of the present invention. When a weight 2513 touches a pressure sensor 2514 a timing counter (not shown) for determining a timing interval is activated. The pressure sensor 2514 is activated only when a top surface of the pins 2507-2510 are horizontally aligned, as illustrated in FIG. 25. The pins 2507-2510 are aligned only when the proper physical key 2505 is inserted into a keyhole 2506.

When the pins 2507-510 are aligned, a string-like or wire-like component 2512, which is disposed through the top of each pin 2507-2510 and through a static component 2511, allows the weight 2513 to reach the pressure sensor 2514. Responsive to a signal from the pressure sensor, an electrical component (not illustrated) notifies the user when the time interval counter changes. The user can then track or count the number of time intervals to be sure he removes the key during the correct time interval. In this embodiment the user must know beforehand the correct time interval for removing the key from the key hole (that is, ending the secure system act). The notification of time interval changes can be in the form of haptic feedback such as by vibrating the key or lock or by emitting a sound.

Note that the act of inserting the key into the hole aligns the pins 2507-2510, and tightens the component 2512. A length of the component 2512 is selected to ensure the weight 2513 will reach the pressure sensor 2514 only when there is no slack in the component 2512. But when the pins 2507-2510 are not aligned the component 2512 does not have a direct path between the pins 2507-2510 and there is insufficient length to allow the weight 2513 to reach the sensor 2514.

Other embodiments employ an electronic-based device for applying pressure to the sensor 2514 or for directly activating the electronic timing component.

Figure 26:
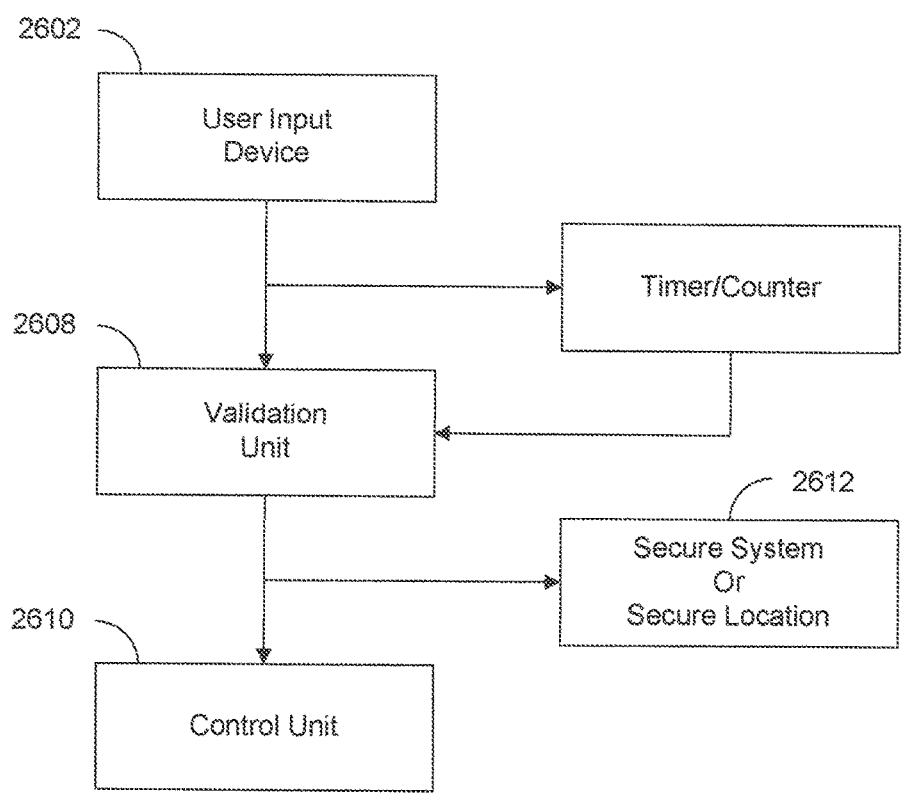
FIG. 26 illustrates the elements of a secure system according to one embodiment of the invention.

FIG. 26 illustrates the elements associated with a secure system according to one embodiment of the invention. A user begins a secure system act employing a user input device 2602. A validation unit 2608 stores the secure system act and the time interval of the TDP (i.e., the correct or expected secure system act and time interval). A counter/timer 2609 begins counting/incrementing when the secure system act is begun. When the secure system act ends the counter/timer 2609 stops counting and captures the current interval count as the final interval count. This value is input to the validation unit 2608. If the secure system act and the time interval count match the respective stored information (i.e., the correct secure system act and the correct time interval), the validation unit 2608 supplies an authentication signal to a control unit 2610 for permitting the user to gain access to the secure system or location 2612.

According to another embodiment unauthorized intruders are "spoofed" into believing that they have accessed or gained entry to the secure system. That is, the returned content appears to be legitimate but in fact is false. Of course in this embodiment a valid user is granted access to a valid site, only those not authenticated are provided with false content.

Another embodiment phishing security against Trojan horse attacks. As cyber war is being waged the most common opening attack is a phishing attack where the perpetrator sends an email that infects or takes control of a victim's computer. Phishing security according to this embodiment allows the user to click any email address within an email. These emails are then opened up in a separate window that runs a small emulated operating system. Upon closing this window the operating system instance is deleted and the would-be victim's computer and information remain safe.

The general description and the provided detailed descriptions are merely exemplary and explanatory only and are not restrictive of the invention, as defined in the appended claims. Other aspects of the present invention will be apparent to those skilled in the art in view of the detailed description of the invention as provided herein.

Many modifications and other implementations or uses of the invention will come to the mind of one skilled in the art having the benefit of the teachings presented in the foregoing descriptions and the associated drawings. Therefore, it is understood that the invention is not to be limited to the specific examples disclosed in this application, and that modifications and additional implementations are intended to be included in this patent application.

What is claimed is:

1. An apparatus for authenticating a user to gain access or entry to a secure system or a secure location, the apparatus comprising:
a time interval count threshold identifying a number of time intervals beyond which the user must complete a secure system act, the time interval count threshold revealed to or known by the user prior to the user ending the secure system act, each time interval having a predetermined length;
a counter for determining an actual time interval count representing a number of time intervals between a time when the user begins the secure system act and the user ends the secure system act;
a validation unit for determining whether the secure system act matches a correct secure system act, and for determining whether the actual time interval count exceeds the time interval count threshold, and for producing an authentication signal responsive to a first affirmative result of the secure system act matching the correct secure system act, and to a second affirmative result of the actual time interval count exceeding the time interval count threshold;
a control unit for permitting the user to gain access to the secure system or to the secure location responsive to the authentication signal; and
wherein the user selects a secure system act and wherein the time interval count threshold is responsive to a selected secure system act.

2. The apparatus of claim 1 wherein the operation that begins the secure system act comprises one or more of full insertion of a physical key into a keyhole, holding a physical key near the keyhole, turning the key in the keyhole, non-nulling of a data entry field, clicking into an entry field, tabbing into an entry field, placing a finger onto a touch screen, placing a finger onto a fingerprint reader, moving a joystick or controller, placing an eye in front of a retina scanner, touching the first number in a PIN entry, making an audible noise, holding a NFC enabled phone, device, card or otherwise within range of a NFC reader, placing a device into a computer, showing a tattoo to a reader, showing a device within or on a person within a certain distance from a reader, extracting information from something on or within a person, moving to start a movement password, and when a user begins a certain action for a second time.

3. The apparatus of claim 1 wherein the operation that ends the secure system act comprises one or more of a turning a physical key in or withdrawing a physical key from a keyhole, making an entry field, resetting the secure system act attempt, clearing the alphanumeric password entry or clearing any action that is considered a start of a secure system act, clicking out of the entry field, tabbing out of the entry field, pulling a finger away from the touch screen, removing a finger from a fingerprint reader, removing an eye from a retina scanner, touching the last number in a PIN entry, submitting/entering/clicking an icon to enter/submit/deactivate, making a noise (such as saying a word or speaking), removing an NFC-enabled communications device out of range of an NFC reader, removing a device (such as a YubiKey) from a computer, showing a tattoo to a reader, moving out of range from a reader that reads an article that is within or on a person, taking information from something on or within a person, removing a tattoo from a reader field, or moving out of the reader's range, removing information from something on or within a person, moving to start the movement password, completing the movement/pattern/picture password, hitting a certain number of correct points, saying/clicking/gesturing/or otherwise indicating that the attempt is complete, submitting, clicking off, pressing enter, tabbing, deactivating, completing a valid secure system act alone.

4. The apparatus of claim 1 wherein the secure system act comprises one or more of a entering an alphanumeric password, entering a PIN, tracing a shape on a screen or a keyboard, speaking, providing a physical device, interacting with an interface that records information, and interacting with an interface receiving input from a user.

5. The apparatus of claim 1 wherein the secure system act comprises a first act input via either a mechanical device or an electrically-based sensor and a second act input via a mechanical device.

6. The apparatus of claim 1 further comprising a display, wherein the time interval count threshold is displayed to the user on the display before or during execution of the secure system act.

7. The apparatus of claim 1 wherein the time interval count threshold and the actual time interval count are both measured in seconds or in a number of time intervals.

8. The apparatus of claim 1 each time interval having a fixed or a variable duration in the actual tine interval count, and each time interval having a same fixed or variable duration in the time interval count threshold.

9. The apparatus of claim 1 wherein if the user ends the secure system act prior to the time interval count threshold the authentication signal is not produced.

10. The apparatus of claim 1 further comprising a display, wherein if the user is denied access or entry to the secure system or the location, false information is presented to the user on the display.

11. The apparatus of claim 1 further comprising a display, the actual time interval count and the time interval count threshold displayed to the user as numeric or non-numeric images on the display.

12. The apparatus of claim 1 wherein the counter is reset whenever the secure system act is restarted.

13. The apparatus of claim 1 wherein the secure system act comprises a plurality of secure system act segments with a time interval count threshold associated with each segment, the validation unit for determining whether each segment of the secure system act matches a corresponding segment of the correct secure system act, and for determining that each time interval identifier exceeds the time interval count threshold for each segment of the secure system act.

14. The apparatus of claim 1 further comprising a display, wherein each time interval comprises a time interval identifier and the time interval identifiers or the time intervals are displayed to the user.

15. The apparatus of claim 1 wherein the correct time interval count is changed to an alternative correct time interval count, the validation unit responsive to the alternative correct time interval count instead of the correct time interval count.

16. The apparatus of claim 1 wherein if the actual time interval count does not exceed the time interval count threshold the actual time interval count is displayed to the user.

17. The apparatus of claim 1 wherein the time interval count threshold is one second and an actual time interval count greater than one second produces the second affirmative result.

18. An apparatus for authenticating a user to gain access or entry to a secure system or a secure location, the apparatus comprising:
- a time interval duration during which the user must complete a secure system act, the time interval duration revealed to or known by the user prior to the user ending the secure system act and comprising a plurality of time intervals, each time interval having a predetermined length;
- a counter for determining an actual time interval count representing a number of time intervals between a time when the user begins the secure system act and the user ends the secure system act;
- a validation unit for producing a first affirmative result if the secure system act matches a correct secure system act, for producing a second affirmative result if the actual time interval count is within the time interval duration, and for generating an authentication signal responsive to the first and second affirmative results;
- a control unit for permitting the user to gain access to the secure system or to the secure location responsive to the authentication signal; and
- wherein the user selects a secure system act and wherein the time interval duration is responsive to a selected secure system act.

19. The apparatus of claim 18 wherein if the user ends the secure system act in less time than the time interval duration or in more time than the time interval duration, the second affirmative result is not produced.

* * * * *